Jan. 19, 1965   W. W. SLAGHT   3,166,362
INTERMEDIATE PROPELLER SHAFT BEARING MEANS
Original Filed Dec. 20, 1957   4 Sheets-Sheet 1

INVENTOR.
WILLIAM W. SLAGHT
BY Evans & Pearne
ATTORNEYS

INVENTOR.
WILLIAM W. SLAGHT
BY Evans & Pearne
ATTORNEYS

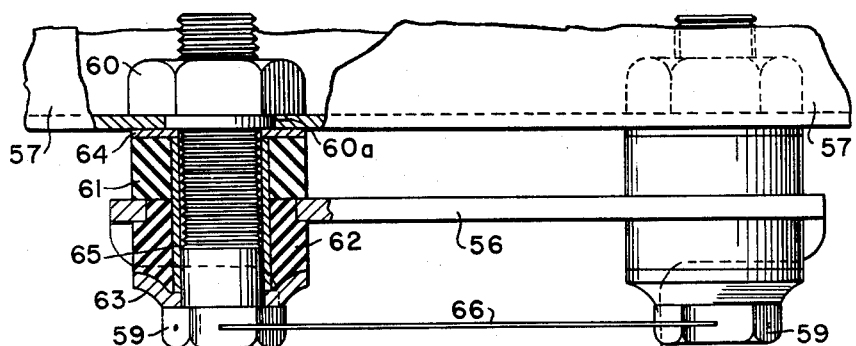
FIG. 6
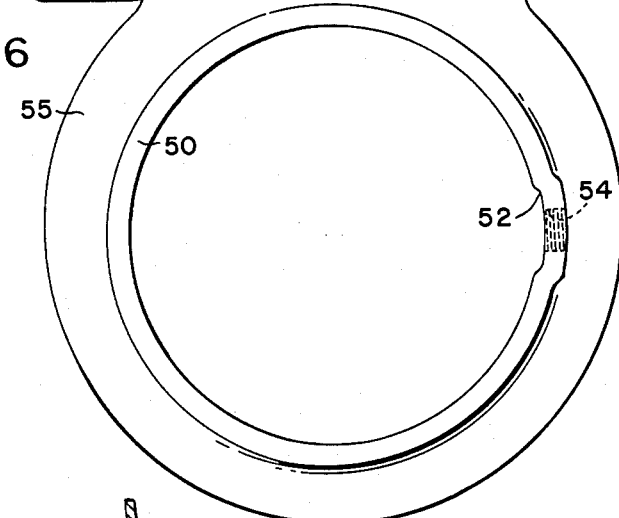
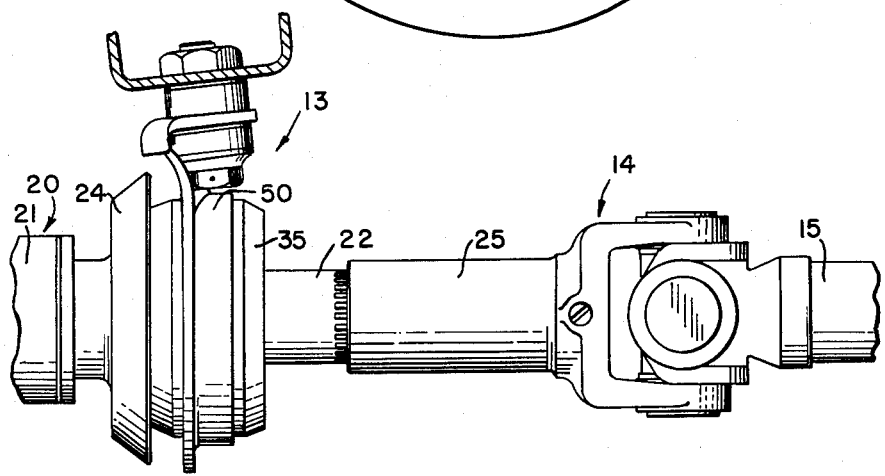
FIG. 7
INVENTOR.
WILLIAM W. SLAGHT
BY Evans & Pearse
ATTORNEYS Jan. 19, 1965   W. W. SLAGHT   3,166,362
INTERMEDIATE PROPELLER SHAFT BEARING MEANS
Original Filed Dec. 20, 1957   4 Sheets-Sheet 4

INVENTOR.
WILLIAM W. SLAGHT
BY Evans & Learne
ATTORNEYS

United States Patent Office

3,166,362
Patented Jan. 19, 1965

---

3,166,362
INTERMEDIATE PROPELLER SHAFT
BEARINGS MEANS
William W. Slaght, Fairview Park, Ohio, assignor to Cleveland Steel Products Corporation, Cleveland, Ohio, a corporation of Ohio
Continuation of application Ser. No. 704,125, Dec. 20, 1957. This application Apr. 26, 1962, Ser. No. 193,042
6 Claims. (Cl. 308—184)

This invention relates to propeller shaft and bearing assemblies and more particularly to an intermediate propeller shaft bearing assembly for use in automotive vehicles or in other applications where torque-transmitting shafts are to be rotatably supported. Reference is made to my copending application Serial No. 704,125, filed December 20, 1957, of which this application is a continuation, and to my application Serial No. 633,113, filed January 8, 1957 (now abandoned), of which said application Serial No. 704,125 was a continuation in part.

Many current vehicle designs call for the provision of relatively long torque-transmitting linkages or propeller shafts between the vehicle transmission and the rear differential drive. The use of the invention in such an application is particularly advantageous and the invention is accordingly described in connection with such an application. However, the possible utility of the invention in other applications will become apparent.

Shaft flexure increases as the length of unsupported shaft increases. In supporting a long shaft against flexure, cost and space considerations dictate that the diameter of the long propeller shaft be not overly increased from normal. Greatest economy is effected by using longitudinally intermediately bearings rather than resorting to increased shaft diameter, the long shaft being divided into sections which are coupled through intermediate universal joints. The assembly of such linkages has heretofore involved press-fitting of intermediate ball bearings on the propeller shaft prior to the final assembly of the propeller shaft on the vehicle chassis. Their disassembly for replacement or repair has involved the dismounting and remounting of the entire depending assembly which supports the intermediate bearing below the chassis. Another disadvantage of the prior art has been the tendency of the intermediate ball bearings to chatter and wear due to their inability to accommodate flexure and longitudinal movement and vibration of the propeller shaft caused by vibration of the resiliently mounted vehicle engine at one end of the shaft and the normal movement of the spring mounted rear axle at the other end of the shaft.

The use of roller bearings in such applications has not heretofore proved feasible, even when they are resiliently mounted, because of the inability of such bearings to satisfactorily accommodate the small, but almost continuous, longitudinal reciprocating movement of the propeller shaft relative to the vehicle frame and small shaft misalignments which almost inevitably occur in manufacturing assembly.

An object of the present invention is to provide a structure for intermediate bearing support of a long propeller shaft linkage, in which structure either a roller (or needle) bearing or a ball bearing is utilized in such a way as to enable it to accommodate both propeller shaft misalignment and longitudinal movement.

Another object of the invention is to provide such a structure in which a bearing is resiliently mounted by radially compressible means in such a way that permanent shaft misalignment may be accommodated while, at the same time, satisfactory resilient support characteristics of the mounting are maintained.

Another object of the invention is to provide a structure of the type described in which a bearing is resiliently mounted in such a way that the effects of shaft-to-bearing misalignment on the characteristics of the resilient mounting are minimized.

Another object of the invention is to provide a structure of the type described in which the propeller shaft forms the inner race of a roller bearing which may be effectively lubricated and sealed against dust and dirt under operating conditions.

Another object of the invention is to provide a structure of the type described which can be conveniently disassembled and reassembled during repair or replacement of the bearing or the associated propeller shaft, without the necessity of removing the entire mounting structure associated with the bearing.

Another object of the invention is to provide a structure of the type described which can be readily accommodated to different distances of suspension of the propeller shaft below a vehicle chassis.

These and other objects and advantages of the invention will become more fully apparent from the following description of examples of the invention which are set forth by way of example. The accompanying drawings illustrate the described examples of the invention. In the drawings:

FIGURE 6 is a view taken from line 6—6 in FIGURE 1 showing only the support assembly.

FIGURE 7 is an elevation of the assembly shown in FIGURE 1 together with additional elements.

FIGURE 8 is a fragmentary cross-sectional view showing a modified bearing and seal assembly suitable for mounting on the stub extension 22 shown in FIGURE 1.

Figure 5:
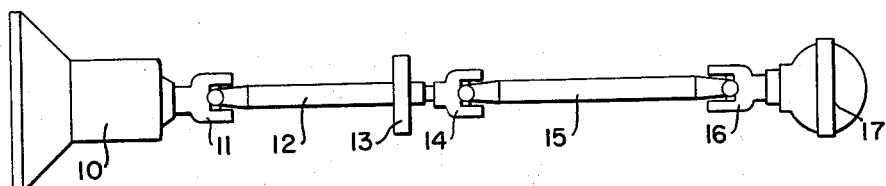
FIGURE 5 is a schematic illustration of an installation using a long center-bearing-supported propeller shaft of a type to which the invention is pertinent.

A conventional long propeller shaft linkage employing an intermediate bearing support is schematically illustrated in FIGURE 5. A transmission 10, associated with a vehicle's engine, is coupled to a universal joint 11 which drives a propeller shaft 12. The output end of the propeller shaft 12 is supported by an intermediate bearing 13 and is coupled to an intermediate universal 14. The intermediate universal 14 is coupled to a rear universal 16 through a propeller shaft 15. The output end of the universal 16 is coupled to a differential drive 17 associated with a rear axle of the vehicle on which the torque-transmitting linkage is mounted.

It is to be noted that in practice, assembly of a long torque-transmitting linkage, such as that shown in FIGURE 5, will almost inevitably result in some slight misalignment between the axis of the propeller shaft 12 and the central axis of the mounting for the bearing 13. It should also be noted that both the propeller shafts 12 and 15 are subjected to longitudinal vibration. The rearmost propeller shaft 15 is usually subjected to a higher amplitude of longitudinal vibration than is the forward propeller shaft 12. The greater longitudinal displacement of the rearward shaft 15 is due to the fact that the spring mounted rear axle of the vehicle has a far greater degree of play than does the resiliently mounted engine and transmission 10. It is desirable that the forward propeller shaft 12 be splined to the intermediate universal 14 at a point rearward of the intermediate bearing 13. This location of a splined connection between the forward propeller shaft and the intermediate universal relieves the intermediate bearing 13 from much, but not all, of the severe longitudinal vibration which occurs in the rearmost propeller shaft. The intermediate bearing 13 is also subjected to positive longitudinal vibration of the forward propeller shaft 12 which may have a considerable amplitude. The long propeller shafts, as parts of the torque-transmitting linkage, are also subject to flexure, and such flexure imposes thrust loads on the intermediate bearing 13.

Figure 1:
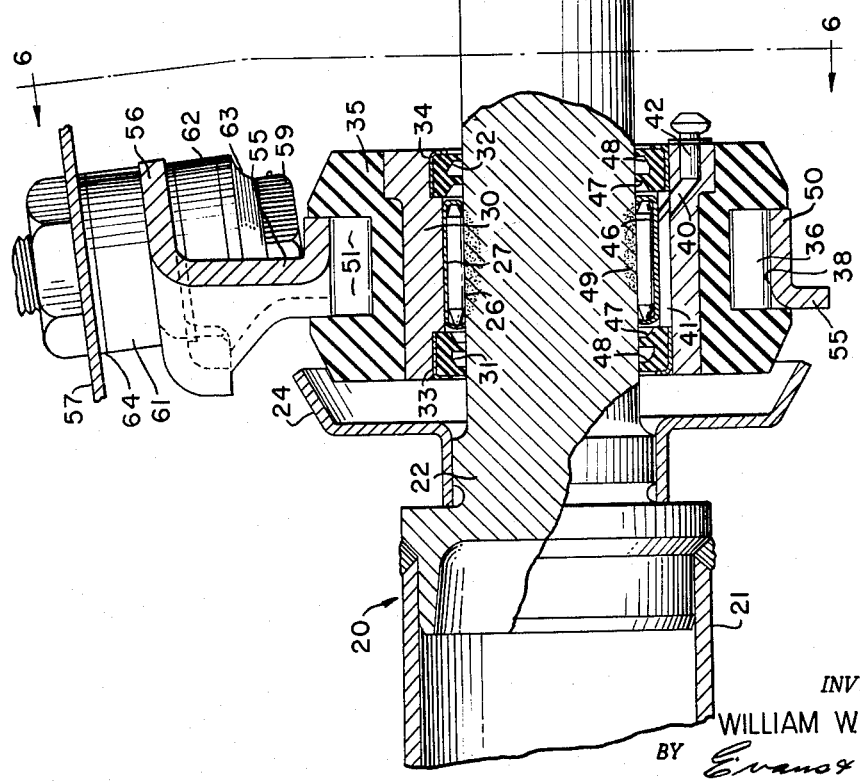
FIGURE 1 is an elevation, partly in cross-section, of a center bearing assembly and associated elements illustrating an example of the invention.

According to the present invention, the structure shown in FIGURE 1 may be provided in a linkage of the type shown in FIGURE 5. In FIGURE 1 there is illustrated a propeller shaft 20 which replaces the forward propeller shaft 12 shown in FIGURE 5. The propeller shaft 20 may comprise a tube 21 to which is welded a stub extension 22. The outer end of the stub extension 22 is splined as indicated at 23. The splines 23 are designed to mate with a splined drive yoke of an intermediate universal corresponding to the universal 14, shown in FIGURE 5. In the illustration, the stub extension 22 is provided with the male spline fitting 23, which mates with a female fitting or sleeve shaft 25 on the intermediate universal 14. Alternatively, the stub extension 22 may comprise a female or sleeve spline which will mate with a male spline on the intermediate universal.

The forward end of the stub extension 22 supports a splash shield 24. Located immediately behind the splash shield 24 is an intermediate bearing assembly, including a roller bearing comprising rollers, such as the rollers 26, which may be suitably retained in a raceway ring 27 constituting the outer raceway of the roller bearing. Surrounding the ring 27 is a sleeve 30 which, together with the raceway ring 27, constitutes an outer race and in which are positioned, at either end, sealing rings 31 and 32. The sealing rings 31 and 32 are preferably made of a tough, resilient, oil resistant elastomer, such as neoprene or the like, and are held in position by flanged metal retaining rings 33 and 34 which are press fitted within the ends of the sleeve 30 within the counterbores formed therein, as shown. The metal rings 33 and 34 are bonded to the sealing rings 31 and 32 by conventional means. Surrounding the bearing structure described above is a bearing housing or support 35 of resilient and flexible material, such as rubber or equivalent elastomers. The support 35 is provided with axially extending ribs 36 formed within the annular groove 51, formed around the outer surface of the support 35. The ribs 36 are tapered outwardly from their roots and snugly engage the inner surface 38 of a flange 50, to be described below. The outer race sleeve 30 is bonded to the housing or support 35 by conventional means. Formed in the sleeve 30 is a grease passageway 40 which communicates with an axially extending grease channel 41, also formed in the sleeve 30. A grease gun fitting 42 is anchored within the grease channel 40. A hole 46 is formed in the outer race 27 and is aligned with the grease passageway 40 and channel 41 (FIGURE 1).

The rings 31 and 32 may be chamfered as at 47 and formed with additional grooves 48. Preferably small flats are formed between the chamfers 47 and the grooves 48 and between the grooves 48 and the outer ends of the rings 31 and 32. The inside diameter of the rings 31 and 32 at these flats is preferably about .015 inch less than the outside diameter of the shaft or stub extension 22 whereby a tight, elastic, gripping relationship of the seals about the shaft is maintained. The rings 31 and 32 are in sealing contact with the stub extension 22, and the conformation of the chamfers 47 and grooves 48 is such as to make it relatively easy for pressurized grease to be forced outwardly between the sealing rings and the stub extension 22 while at the same time inhibiting inward movement of dirt, water, or other foreign matter past the sealing rings. In this manner, flushing and sealing characteristics are combined in a highly advantageous way. Inner grooves formed by the chamfers 47, as well as the grooves 48, tend to remain filled with grease and constitute effective grease dams which seal the inner bearing structure against entry of dirt or other foreign matter. The portion of the surface of the stub extension 22 between the sealing rings 31 and 32 is casehardened as indicated at 49 and constitutes the inner raceway for the rollers 26 of the roller bearing.

The outer mounting assembly in which the housing or support 35 is fixed is shown most clearly in FIGURE 6. This mounting assembly comprises the central flange 50 which fits in the annular groove 51 formed around the outer surface of the housing 35. The central flange 50 may have a depression 52 in which is seated an outer longitudinal rib 53 formed in the housing 35. The flange 50 may be tapped at 54 to receive a bolt 58 which extends into a hole 63 formed in the support 35. The housing is thus keyed against rotation relative to the flange 50. The central flange 50 extends from a more-or-less vertical flange 55 which terminates at the upper portion of the structure in a top flange 56 through which extend mounting bolts 59. The mounting bolts 59 extend upwardly from the top flange 56 and through a portion of the chassis of the vehicle on which the torque-transmitting linkage is employed. Thus, the top flange 56 may be fixed to a chassis beam 57 by the bolts 59 and nuts 60. As shown in FIGURE 6, the nuts 60 are preferably provided with cylindrical bosses 60a which may extend axially about the thickness of the metal of which the beam 57 is constructed and fit into apertures therein, as shown. This aids in positioning the nuts to receive the bolts 59 during assembly of the structure and facilitates tack welding the nuts in place prior to assembly, if desired.

Between the top flange 56 and the beam 57, cushioning washers 61 of rubber or similar resilient material are provided on the bolts 59. Between the top flange 56 and the heads of the bolts 60, additional cushioning washers 62 of similar material, preferably countersunk into the top flange 56, and metal retaining washers 63 are also provided on the bolts 59. One or more rigid spacer washers 64 of any suitable axial thickness may also be provided on the bolts 59, the length of the bolts being selected according to the axial thickness and number of spacer washers 64 required to provide the desired spacing between the top flange 56 and the chassis, according to the distance which it is desired to support the shaft linkage below the chassis. To permit the bolts 59 and nuts 60 to be securely tightened while causing only a predetermined degree of compression of the cushioning washers 61 and 62, rigid sleeves 65 are also provided on the bolts 59 and are placed under axial compression as the bolts 59 and nuts 60 are tightened. Any suitable means, such as a wire clip 66 may be employed to lock the bolts 59 against rotation and loosening of the assembly after the bolts and nuts have been tightened.

Referring to FIGURE 8, the modified bearing and seal assembly shown therein is an alternative to the similar assembly shown in FIGURE 1, being mounted in the same manner in the resilient bearing support or housing 35, which is in turn fixed in the central flange 50 of a mounting bracket (not shown in FIGURE 8). This bearing and seal assembly is adapted to surround the stub extension 22 of the propeller shaft 20 and to support the same in essentially the same manner as the similar assembly of FIGURE 1. In this instance, however, the needle bearings 26 of FIGURE 1 are replaced by modified roller bearings 126, held in an outer raceway ring 127 by a cage ring 128 provided with elongated apertures 129. The roller bearings 126 project radially through the apertures 129 for contacting the stub extension 22 constituting the inner raceway, but are greater in diameter than the width of the apertures, so they are retained by the cage ring, which is in turn retained by inturned circumferential flanges 127a of the outer raceway ring 127.

The outer raceway ring 127 is press fitted in a sleeve 130, similar to the sleeve 30 in FIGURE 1. Also in a manner similar to FIGURE 1, identical resilient sealing rings 131 and 132 are respectively bonded in metal retaining rings 133 and 134 which are press fitted within the counterbores formed in the ends of the sleeve 130. As hereinbefore described, the resilient sealing rings permit pressurized grease to be forced outwardly therethrough while at the same time inhibiting inward movement of dirt, water, or other foreign matter.

While annular grease retaining rings of felt or the like are relatively effective in excluding solid dirt particles, they are otherwise inferior to the resilient elastomeric sealing rings 31 and 32 or 131 and 132 for permitting escape of pressurized grease while excluding water. On the other hand, any solid dirt particles that might work their way between either of the flat lands of the elastomeric seals and the stub extension 22 may tend to wear the seals over a period of time and impair their superior sealing action. To prevent this from occurring, additional sealing rings 135 and 136, mounted in flanged metal retaining rings 137 and 138, are also press fitted within the counterbores formed in the ends of the sleeve 130, outwardly of the seals 131 and 132. These felt rings thus serve to protect and prolong the life of the resilient elastomeric seals, as well as to provide the additive sealing effects of the two kinds of seals.

Figure 9:
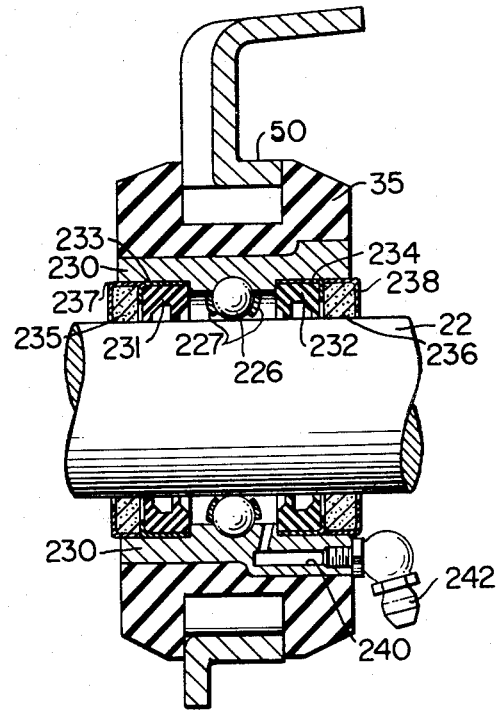
FIGURE 9 is a fragmentary cross-sectional view, similar to the sectioned portion of FIGURE 1, showing another bearing and seal assembly.

Referring to FIGURE 9, the modified bearing and seal assembly shown therein is mounted in a resilient bearing support or housing 35 in the same manner as is the bearing and seal assembly of FIGURE 1. The housing 35 is in turn fixed in the central flange 50 of a mounting bracket (not shown in FIGURE 9). This bearing and seal assembly is received on the stub extension 22 of the propeller shaft and supports the same to constitute a ball bearing assembly. A sleeve 230 is provided which is similar to the sleeve 30 except that it is formed with a groove to constitute a ball raceway, as shown. A plurality of ball bearings 226 are held in the outer ball raceway by a cage ring 227 from which the balls 226 project radially inwardly into contact with the stub extension 22 constituting the inner raceway. Also in a manner similar to FIGURE 1, identical resilient sealing rings 231 and 232 are respectively bonded in metal retaining rings 233 and 234 which are press fitted within the counterbores formed in the ends of the sleeve 230. Formed in the sleeve 230 is a grease channel 240 which communicates with the interior space between the rings 231 and 232. A grease gun fitting 242 is mounted on the sleeve 230 and communicates with the grease channel 240. The resilient sealing rings 231 and 232 permit pressurized grease to be forced outwardly therethrough while at the same time inhibiting inward movement of dirt, water or other foreign matter.

In a manner similar to that of the structure shown in FIGURE 8, additional annular grease retaining sealing rings 235 and 236 of felt or the like are provided. They are mounted in flanged metal retaining rings 237 and 238 and are press fitted within the counterbores formed in the ends of the sleeve 230, outwardly of the seals 231 and 232. Again, these felt rings serve to protect and prolong the life of the resilient elastomeric seals, as well as to provide the additive sealing effects of the two kinds of seals.

Figure 10:
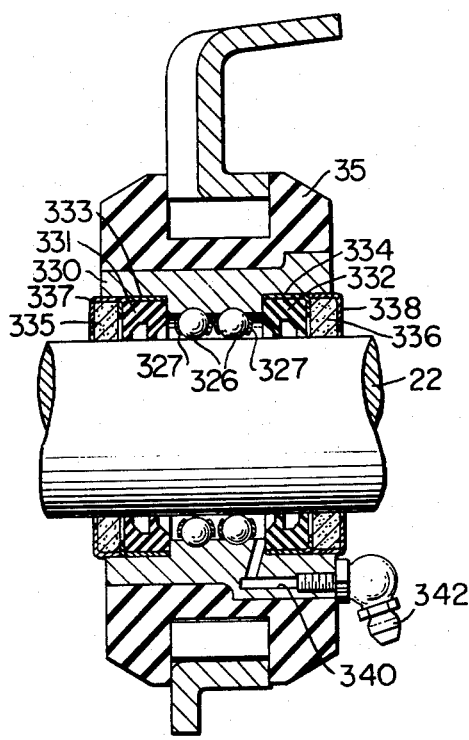
FIGURE 10 is a fragmentary cross-sectional view, similar to the sectioned portion of FIGURE 1, showing still another bearing and seal assembly.

Referring to FIGURE 10, the modified bearing and seal assembly shown therein is mounted in a resilient bearing support or housing 35 in the same manner as is the bearing and seal assembly of FIGURE 1. The housing 35 is in turn fixed to the central flange 50 of a mounting bracket (not shown in FIGURE 10). This bearing and seal assembly is received on the stub extension 22 of the propeller shaft and supports the same to constitute a ball bearing assembly. A sleeve 330 is provided which is similar to the sleeve 30 except that it is formed with grooves to constitute ball raceways, as shown. A plurality of ball bearings 326 are held in the outer ball raceways by cage rings 327 from which the balls 326 project radially inwardly into contact with the stub extension 22 constituting the inner raceway. Also in a manner similar to FIGURE 1, identical resilient sealing rings 331 and 332 are respectively bonded in metal retaining rings 333 and 334 which are press fitted within the counterbores formed in the ends of the sleeve 330. Formed in the sleeve 330 is a grease channel 340 which communicates with the interior space between the rings 331 and 332. A grease gun fitting 342 is mounted on the sleeve 330 and communicates with the grease channel 340. The resilient sealing rings 331 and 332 permit pressurized grease to be forced outwardly therethrough while at the same time inhibiting inward movement of dirt, water or other foreign matter.

In a manner similar to that of the structure shown in FIGURE 9, additional annular grease retaining sealing rings 335 and 336 of felt or the like are provided. They are mounted in flanged metal retaining rings 337 and 338, respectively, and are press fitted within the counterbores formed in the ends of the sleeve 330, outwardly of the seals 331 and 332. Again, these felt rings serve to protect and prolong the life of the resilient elastomeric seals, as well as to provide the additive sealing effects of the two kinds of seals.

It will be understood that all the above described examples of bearing structures contemplated by the invention, such as those illustrated in FIGURES 1, 8, 9 and 10, may be employed as the intermediate bearing 13 (FIGURE 5). In each of these cases, a propeller shaft, such as the propeller shaft 20 provided with a stub extension 22, will be understood to constitute the forward propeller shaft 12 so that in each case the intermediate bearing structure is, according to the invention, provided with a stub shaft extension as the rearmost element of the forward propeller shaft.

As will be apparent from the drawings, the above described arrangements for suspending the bearing assembly from the chassis beam 57 permit limited, universal, cushioned movement of the entire bearing assembly relative to the chassis member from which it is suspended, with virtually no relative movement of any engaged metal parts which might cause wear of those parts or chattering of one metal part against another. The arrangement also permits simple adjustment of the distance between the axis of the bearing assembly and the chassis by varying the axial thickness and/or number of spacer washers 64. This suspension arrangement is easily assembled and disassembled during initial installation and subsequent servicing of the bearing assembly in the event any replacement of parts is required.

When there is slight misalignment between the stub shaft 22 and the mounting of the intermediate bearing 13, the housing 35 and the sleeve 30, 130, 230 or 330 are rotated slightly within the flange 50 in a manner involving relative angular movement of their respective axes. The tapered ribs 36 minimize the effects of misalignment on the characteristics of the resilient mounting of the bearing and are also instrumental in absorbing and damping flexure of the forward propeller shaft 20. This action of the illustrated resilient mounting and the ability of the bearing to slide fore and aft on the stub shaft 22 results in an intermediate bearing of long service life and one in which bearing noise and chatter and corresponding wear and fatigue are minimized or eliminated.

Figure 2:
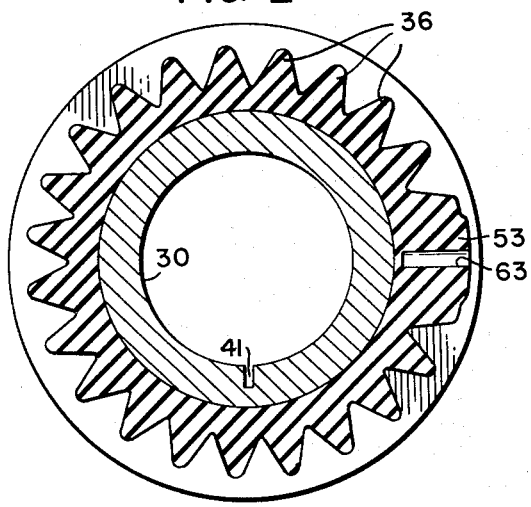
FIGURE 2 is a view taken on line 2—2 in FIGURE 3.
Figure 3:
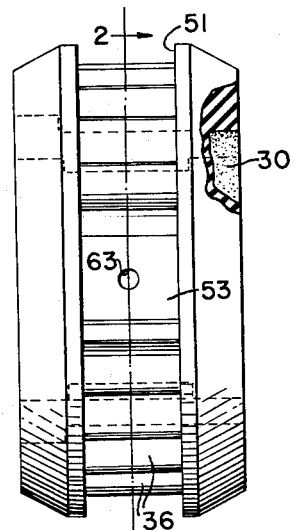
FIGURE 3 is an elevation, partly broken away, of the resilient bearing support or housing and the bearing sleeve, both of which are included in the assembly shown in FIGURE 1.
Figure 4:
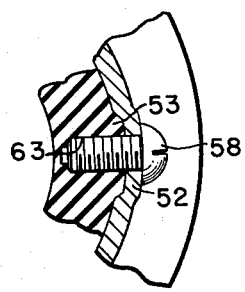
FIGURE 4 is a detail view in cross-section of a fastening between the structure shown in FIGURE 2 and that shown in FIGURE 6.

Manufacturing assembly of the illustrated examples of the invention is readily accomplished. In the assembling procedures, the sleeve 30 may be inserted within the housing 35 while the housing 35 is in its undistended condition, as shown in FIGURES 2 and 3. If it is desired to repair or replace elements of the torque-transmitting linkage, such as the propeller shaft 20 or the bearing itself, it is only necessary to disconnect the forward universal (corresponding to the universal joint 11 in FIGURE 5) whereupon the propeller shaft 20 can be canted to one side of the transmission, and the stub shaft 22 can then be withdrawn. If the bearing is to be replaced, and if the nuts 60 (FIGURE 6) are not tack welded, the bolts 59 may be removed simply by backing off the bolts 59 or the nuts 60, and the flange 56 and all the outer mounting assembly structure which depends therefrom may be replaced, including the housing 35 and the bearing. If the nuts 60 are tack welded and the entire assembly is to be replaced, the bolts 59 are removed with a cutting torch or a mechanical cutting tool such as a hacksaw, and replacement bolts 59 and nuts 60 are employed. This may also necessitate destruction and replacement of the cushioning spacer washers 61 and 62. If desired, the housing 35 may be cut out of the flanges 50, the bolt 58 (FIGURE 4) may be temporarily removed, and a new housing 35 may be forced into place within the flange 50 and the bolt 58 may be thereafter replaced. Re-assembly is completed by inserting the stub shaft 22 through the sleeve 30, 130, 230, or 330, and past the bearing and sealing elements contained in the sleeve. In order to bring the sleeve 30, 130, 230, or 330 into alignment with the shaft to permit the insertion, longitudinal force may be exerted against an exposed end face of the sleeve at an annular location which will tilt the sleeve in the proper direction. The housing deforms slightly to accommodate this tilting. When the linkage is disassembled, bearing elements, such as the elements 26, 27, 31 and 32, or the elements 126, 127, 131, 132, 135 and 136, or the elements 226, 227, 231, 232, 235 and 236, or the elements 326, 327, 331, 332, 335 and 336, are made easily accessible. The bearing mounting assembly can remain in position during replacement or repair of the propeller shaft linkage. The awkward and troublesome task of re-hanging the intermediate bearing support following replacement or repair of the propeller shaft linkage is thus avoided.

The description of the illustrated examples of the invention will suggest other modifications and variations in detail, and the invention is not limited to all the details of the illustrated examples. For example, the invention may be employed in torque-transmitting linkages which have two or more intermediate bearing supports. The scope of the invention is defined in the following claims.

What is claimed is:

1. In a propeller shaft linkage for torque transmission along a chassis, a subassembly comprising a propeller shaft surrounded by a bearing, said shaft constituting an inner race of said bearing, a metal bearing sleeve surrounding the outer race of said bearing, a housing of resilient flexible material surrounding said sleeve and bonded thereto, said housing having an annular groove extending around its outer surface and across which extend annularly distributed axially extending ribs, said ribs being tapered radially outwardly from their roots, annular sealing rings received within the ends of said bearing sleeve and surrounding said propeller shaft in sealing relationship therewith, means surrounding said housing for supportedly suspending said housing from said chassis, said last named means being in gripping relationship with said ribs, the outer race of said bearing being substantially unrestrained except through said housing against displacement relative to said chassis, including both angular displacement about transverse axes and longitudinal displacement, a grease gun fitting on one end of said sleeve, grease channel means in said sleeve communicating with said fitting and with said bearing and the inner sides of said sealing rings, the inner peripheries of said sealing rings being annularly grooved to provide grease dams whereby said bearing and the portion of said propeller shaft which serves as the inner race for said bearing are sealed at each end against dirt by flushable grease dams maintained within said housing.

2. In a propeller shaft linkage for torque transmission along a chassis, a subassembly comprising a propeller shaft surrounded by a bearing, said shaft constituting an inner race of said bearing, a metal bearing sleeve surrounding the outer race of said bearing, a housing of resilient flexible material surrounding said sleeve and bonded thereto, said housing having an annular groove extending around its outer surface and across which extend annularly distributed axially extending ribs, said ribs being tapered radially outwardly from their roots, annular sealing rings received within the ends of said bearing sleeve and surrounding said propeller shaft in sealing relationship therewith, means surrounding said housing for supportedly suspending said housing from said chassis, said last named means including an upper flange, bolts extending through said flange and through said chassis, washers of elastomeric material on said bolts between said flange and the chassis for resiliently supporting said last named means beneath the chassis, at least one rigid washer on each of said bolts between said flange and the chassis, said bolts having sufficient length to allow similar rigid washers to be added to vary the spacing between said flange and the chassis according to the distance which it is desired to support the propeller shaft linkage below the chassis, said last named means also including a flange in gripping relationship with said ribs, the outer race of said bearing being substantially unrestrained except through said housing against displacement relative to said chassis, including both angular displacement about transverse axes and longitudinal displacement.

3. In a propeller shaft linkage for torque transmission along a vehicle frame, a subassembly comprising a propeller shaft surrounded by a bearing, said shaft constituting an inner race of said bearing and comprising a cylindrical shaft portion of uniform diameter extending through said bearing and longitudinally beyond each side thereof so as to allow said shaft to slip axially with respect to said bearing, a housing of resilient flexible material surrounding said bearing, means surrounding said housing and directly connected to said shaft only through the housing and otherwise free of connection with said shaft other than indirectly through said vehicle frame for tying said housing directly to a portion of said vehicle frame, the outer race of said bearing being substantially unrestrained except through said housing against displacement relative to said vehicle frame, including both angular displacement about transverse axes and longitudinal displacement.

4. In a propeller shaft linkage for torque transmission along a vehicle frame, a subassembly comprising a propeller shaft surrounded by a bearing, said shaft constituting an inner race of said bearing and comprising a cylindrical shaft portion of uniform diameter extending through said bearing and longitudinally beyond each side thereof so as to allow said shaft to slip axially with respect to said bearing, and a resiliently cushioning support suspending the outer race of said bearing from said vehicle frame for both resiliently restrained angular displacement relative to said vehicle frame about transverse axes and resiliently restrained longitudinal displacement relative to said vehicle frame, said resiliently cushioning support effectively constituting the sole means for imposing restrictions against said displacements, said resiliently cushioning support being directly connected to said shaft only through said bearing and being otherwise free of connection with said shaft other than indirectly through said vehicle frame.

5. In a propeller shaft linkage for torque transmission along a vehicle frame, a subassembly comprising a propeller shaft having a stub portion extending from one end therof and embraced by a bearing, the stub portion extending from one side of said bearing through said bearing and terminating beyond said bearing at the opposite side thereof, at least an intermediate portion of the stub portion being of uniform diameter and constituting an inner race of said bearing, said uniform diameter portion extending through said bearing and longitudinally beyond each side thereof whereby said shaft may slip axially with respect to said bearing, and the cross-sectional profile of said stub portion from said inner race to the terminal end thereof having no radial extension beyond the cross-sectional profile of the part constituting said inner race, whereby said propeller shaft may be freely withdrawn from and replaced in said bearing, and a resiliently cushioning support for supportedly suspending said bearing from said vehicle frame for both resiliently restrained angular displacement relative to said vehicle frame about transverse axess and resiliently restrained longitudinal displacement relative to said vehicle frame, said resiliently cushioning support effectively constituting the sole means for imposing restrictions against said displacements, said resiliently cushioning support being directly connected to said shaft only through said bearing and being otherwise free of connection with said shaft other than indirectly through said vehicle frame.

6. In a propeller shaft linkage for torque transmission along a vehicle frame, a subassembly comprising: a propeller shaft and bearing therefor in which the shaft constitutes an inner race of the bearing at a location along the length of the shaft intermediate its ends, the shaft in the location of the bearing and for an appreciable distance along its axis in either direction beyond each side of the bearing being cylindrical and of uniform diameter so as to allow the bearing to slide longitudinally on the shaft; the bearing also comprising an outer race and an array of rolling elements disposed between the outer race and the inner race portion of the shaft and in rolling engagement with each and longitudinal sliding engagement with the inner race portion of the shaft; a housing of resilient, flexible material surrounding said bearing; support means surrounding said housing and attached to said vehicle frame for directly connecting the shaft to the frame only through the resiliently flexible housing and the outer race and rolling elements of the bearing, said support means being otherwise free of connection with said shaft other than indirectly through said vehicle frame; and the outer race and rolling elements of the bearing being substantially unrestrained except through said housing against displacement relative to said vehicle frame, including both angular displacement about transverse axes and longitudinal displacement.

References Cited by the Examiner
UNITED STATES PATENTS

| | | | |
|---|---|---|---|
| 2,332,862 | 10/43 | LeTourneau | 308—207 X |
| 2,669,316 | 2/54 | Schjolin. | |
| 2,792,066 | 5/57 | Kleemann et al. | 308—28 X |
| 2,859,071 | 11/58 | Riehl | 308—28 X |
| 2,930,660 | 3/60 | Dunn | 308—28 |

FOREIGN PATENTS

| | | |
|---|---|---|
| 1,102,771 | 5/55 | France. |
| 747,847 | 10/44 | Germany. |
| 775,212 | 5/57 | Great Britain. |

ROBERT C. RIORDON, *Primary Examiner.*

MILTON KAUFMAN, *Examiner.*